No. 666,708. Patented Jan. 29, 1901.
P. J. A. SMITH.
SHOE LACE FASTENER.
(Application filed July 11, 1900.)
(No Model.)
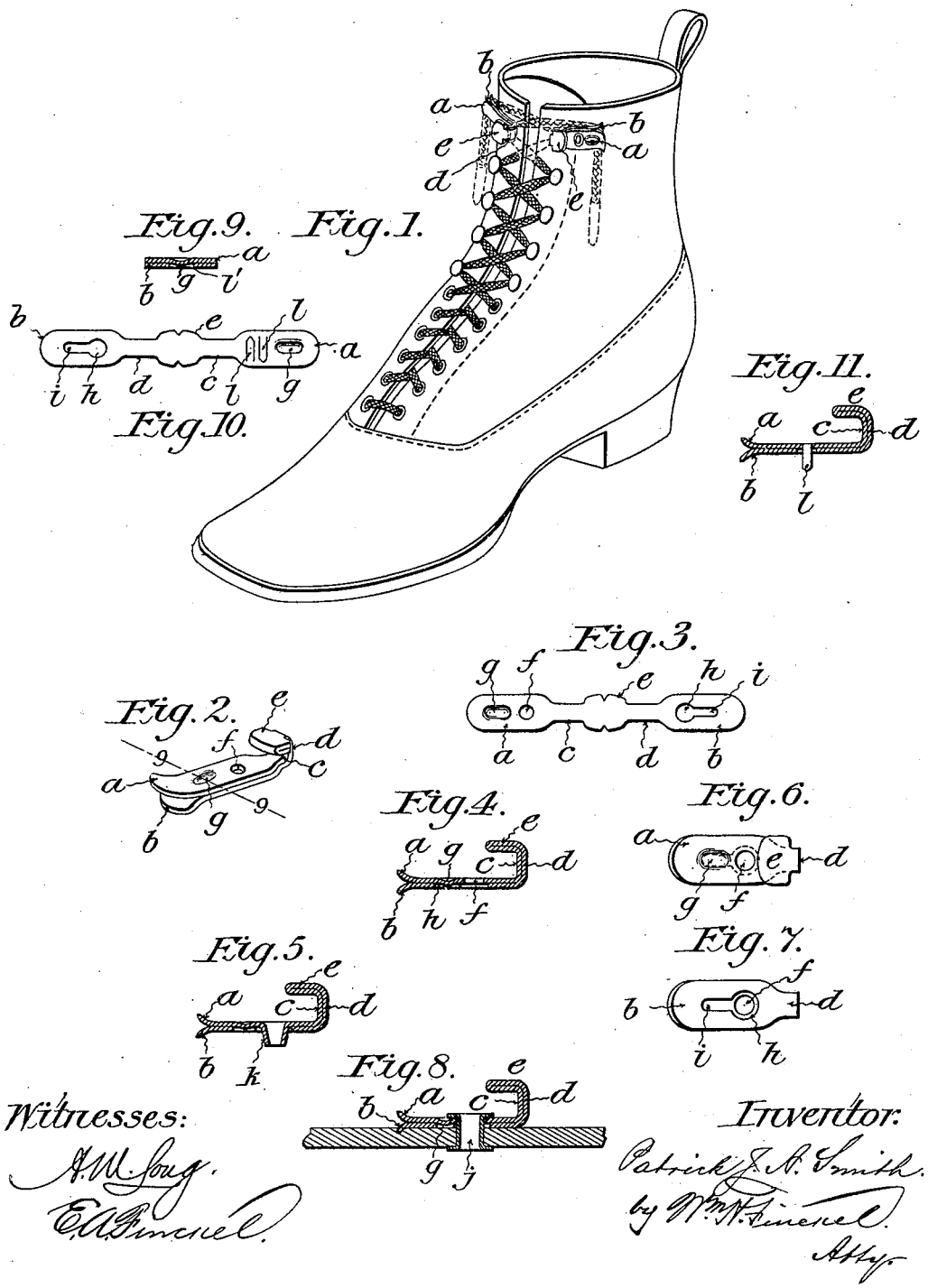

UNITED STATES PATENT OFFICE.

PATRICK J. A. SMITH, OF WASHINGTON, DISTRICT OF COLUMBIA, ASSIGNOR OF ONE-THIRD TO WILLIAM J. GIDDINGS, OF TAKOMA PARK, DISTRICT OF COLUMBIA.

SHOE-LACE FASTENER.

SPECIFICATION forming part of Letters Patent No. 666,708, dated January 29, 1901.

Application filed July 11, 1900. Serial No. 23 220. (No model.)

*To all whom it may concern:*

Be it known that I, PATRICK J. A. SMITH, a citizen of the United States, residing at Washington, in the District of Columbia, have invented a certain new and useful Improvement in Shoe-Lace Fasteners, of which the following is a full, clear, and exact description.

This invention relates to that class of devices which are used to secure the ends of shoe-laces and which serve as substitutes for knotting or tying the ends of such laces.

The invention comprises a metallic device which may be used interchangeably on either side of the flap of the upper and which is constructed with a knob, about whose shank the lace is given one or more turns, and a friction device which is adapted to grasp and hold the end of the lace after it has been engaged with the knob, the device being secured to the shoe-upper by an integral or other fastening, all as I will proceed now more particularly to describe and finally claim.

In the accompanying drawings, illustrating my invention, in the several views of which like parts are similarly designated, Figure 1 is a perspective view of a shoe having my fastener, the fastened ends of the lace being shown in dotted lines. Fig. 2 is a perspective view of one of the fasteners detached. Fig. 3 is a displayed view of one form of the fastener. Fig. 4 is a longitudinal section of the form of fastener shown in Figs. 2 and 3. Fig. 5 is a longitudinal section of a fastener having an integral attaching device. Fig. 6 is a top plan view, and Fig. 7 a bottom plan view, of the form of fastener shown in Fig. 2. Fig. 8 is a longitudinal section showing the fastener of Fig. 2 eyeleted to a piece of fabric. Fig. 9 is a cross-section, on a larger scale, taken substantially in the plane of line 9 9, Fig. 2. Fig. 10 is a displayed view of my fastener with another form of attaching device, and Fig. 11 is a longitudinal section of the form of fastener shown in Fig. 10.

In producing my fastener I blank out of suitable sheet metal or otherwise produce a blank, such as shown in Fig. 3, having end portions $ab$, shank portions $cd$, and a knob portion $e$. The portion $a$ is provided with an opening $f$ and a depression $g$, and the portion $b$ has an opening $h$ of larger diameter than the opening $f$, and from this opening $h$ extends a slot $i$. This blank is then folded on the line of the V cuts in the portion $e$, and the portions $cd$ are bent at substantially right angles to this portion $e$, and then the portions $ab$ are bent at substantially right angles to the portions $cd$. Thus the portion $e$ forms a knob and the portions $cd$ a shank, which are substantially rigid, while the ends of the portions $ab$ are flared from one another, substantially as indicated in Figs. 1, 2, 4, 5, 8, and 11, and these portions constitute a spring friction-clasp. The opening $f$ registers with the opening $h$ and the depression $g$ with the slot $i$. The opening $f$ is engaged by the device which is used to secure the fastener to a shoe, and the opening $h$ is enough larger than the fastening device to insure a limited amount of freedom of motion of the portion $b$ to admit of the insertion of the end of the shoe-lace between the portions $a$ and $b$, and when the lace is thus inserted the depression $g$ forces it against the edges of the slot $i$, and thus exerts a binding force upon such end of the shoe-lace sufficient to retain it against displacement, and while I prefer to use the depression $g$ and slot $i$ for the purpose stated, yet I do not limit my invention thereto, as both features may be omitted and still an efficient fastener be provided.

Various forms of devices may be used for securing the fastener to the shoe, and I have herein illustrated some of these.

In Fig. 8 I have shown an ordinary eyelet $j$ used to secure the fastener of Figs. 1, 2, 3, 4, 6, and 7, while in Fig. 5 the hole $f$ of the other form is replaced by an eyelet $k$ made integral with the upper portion of the fastener, and in Figs. 10 and 11 I have shown the tongues or prongs $l$ cut from the substance of the fastener and turned down through the opening in the lower member. I mean thus to indicate that the invention is not limited to the kind of device that may be used for securing the fastener to the shoe.

As already indicated, one form of fastener constructed in accordance with my invention is applicable alike to either side of the shoe, and when applied to the shoe-upper substantially as indicated in Fig. 1 the lace is strung in any usual manner, and then its right-hand end is given a turn or two around the shank of the left-hand fastener and its free end brought across and engaged between the spring ends of the right-hand fastener, while its left-hand end is given a turn or two around the shank of the right-hand fastener and then carried across and engaged with the spring end of the left-hand fastener. Thus the ends of the lace are first anchored on the knobs and then carried straight across to the respective sides from which they started and secured, so that the pull on the ends of the lace is in a right line and in opposition to the anchorage of the knobs. In this way a double security against becoming loose is afforded.

It is to be noted that the fastener is constructed throughout of one integral piece, and thus its manufacture is simplified and economized and its strength augmented as compared with the fasteners which are made up of several pieces.

I do not limit my invention to its one described use as a shoe-lace fastener, since it is applicable in its present form or mere modifications thereof for fastening various things which may be tied by a string, cord, rope, or thong—such as carriage-curtains, bags, and other objects—and I mean that my claims be so read.

What I claim is—

1. A shoe-lace fastener, comprising a knob, a friction-clasp, and a shank connecting the knob and the friction-clasp and integral therewith, and a fastening medium applied to one member of the friction-clasp and passing freely through an opening in the other member of the friction-clasp and thus affording a certain amount of freedom of motion of the latter member, substantially as described.

2. A shoe-lace fastener, composed of a strip of metal folded upon itself and forming a rigid knob, a spring friction-clasp and a connecting-shank, the lower member of the clasp having an opening through which the device for securing the fastener to the shoe passes freely, substantially as described.

3. A shoe-lace fastener, comprising a knob, a shank, and a friction-clasp, one member of the friction-clasp being slotted and the other member provided with a depression coöperating with such slot in securing the end of the lace, substantially as described.

4. A shoe-lace fastener, adapted for use on either side of a shoe, and comprising an integral knob, a shank at right angles thereto, and a spring-clasp alined with the knob and comprising an outer member adapted to be rigidly connected with the shoe and an inner member parallel therewith and movable independently of the outer member, substantially as and for the purpose described.

In testimony whereof I have hereunto set my hand this 10th day of July, A. D. 1900.

PATRICK J. A. SMITH.

Witnesses:
JNO. M. GEORGE,
FRANK A. STEELE.